United States Patent [19]
Rubin et al.

[11] Patent Number: 5,843,501
[45] Date of Patent: Dec. 1, 1998

[54] RETORTABLE EXTENDED SHELF LIFE FOOD CONTAINER

[75] Inventors: Leslie S. Rubin, Newton; Kent G. Blizard, Ashland, both of Mass.

[73] Assignee: Foster Miller, Inc., Waltham, Mass.

[21] Appl. No.: 590,401

[22] Filed: Jan. 25, 1996

[51] Int. Cl.⁶ .............................. B32B 27/36; B65D 1/28; B65D 43/02
[52] U.S. Cl. .................. 426/127; 206/484.2; 206/524.1; 206/524.2; 206/524.3; 206/524.6; 428/1; 428/480
[58] Field of Search ..................................... 426/112, 113, 426/127; 428/1, 480; 206/484.2, 524.1, 524.2, 524.3, 524.6

[56] References Cited

U.S. PATENT DOCUMENTS

| | | | |
|---|---|---|---|
| 4,896,772 | 1/1990 | Walter et al. | 206/484.2 |
| 4,996,086 | 2/1991 | Gerlowski et al. | 427/421 |
| 5,288,529 | 2/1994 | Harvey et al. | 428/1 |
| 5,589,236 | 12/1996 | Harvey et al. | 428/1 |

FOREIGN PATENT DOCUMENTS

| | | |
|---|---|---|
| 429 654 | 3/1990 | European Pat. Off. . |
| 466 085 | 1/1992 | European Pat. Off. . |
| 503 063 | 9/1992 | European Pat. Off. . |

OTHER PUBLICATIONS

Abstract of Japan 2–253,950 (Published Oct. 12, 1990).
Abstract of Japan 2–253,951 (Published Oct. 12, 1990).
Abstract of Japan 5–177,797 (Published Jul. 20, 1993).

*Primary Examiner*—Leo B. Tentoni
*Attorney, Agent, or Firm*—David G. Conlin; David S. Resnick; Dike, Bronstein, Roberts & Cushman, LLP

[57] ABSTRACT

The retortable multilayer container of the present invention includes a receptacle and lid having at least a barrier layer includes an LCP film and inner food contact layer comprising at least one thermoplastic material. The receptacle has a base portion and a sidewall portion extending from the base portion defining a storage compartment. The storage compartment has a filling volume from about 0.03 to about 20 liters. The receptacle may be in the form of a tray, cup, bowl, tub or bucket. The tray may be designed as a simple tray or a multi-compartment tray. The receptacle may further have a lip portion extending from the sidewall portion providing an area for the lid to rest.

22 Claims, 2 Drawing Sheets

RETORTABLE EXTENDED SHELF LIFE FOOD CONTAINER

This invention was made with government support under contract no. DAAK60-93-0041 and DAAK60-92-0014. The government has certain rights in this invention.

FIELD OF THE INVENTION

The present invention relates to extended shelf life food storage containers. More particularly, the present invention relates to retortable extended shelf life food storage containers suitable for microwave use. In certain embodiments the container is dual ovenable, i.e., are able to be heated in conventional ovens as well as microwave ovens.

BACKGROUND OF THE INVENTION

Thermostabilized foods have successfully been used to feed military personal at fixed locations where freshly prepared standard mess hall food is not available. These meals are presently packaged in sealed epoxy-lined metal trays designed to hold 100 to 120 oz of a single product. Each tray feeds 12 to 18 people and is engineered to provide a shelf life of a minimum of three years without refrigeration. These trays have a number of limitations. The primary limitation is related to the container's unique size and material of construction, i.e., metal. Thus, making the trays not only heavy but also not suitable for microwave use.

Thermostabilized foods are gaining popularity in the commercial market as well, and thus has initiated interest in single and multiple serving extended shelf life food containers which are retortable, i.e, able to withstand autoclaving in steam at 275° F. for 30 minutes. There is also interest in developing extended shelf life containers for foods that are not thermostabilized but are susceptible to air and water exposure. Such foods include, for example, bread, crackers and cookies.

There are two major categories of such containers: 1. trays and 2. cups, cans and buckets. Trays are rectangular in shape, hold about 7 to 30 oz. and are used for entrees, vegetable servings and diet supplements, as well as for pet foods. Plastic trays use a structure of PET or PP and a barrier layer of EVOH or PVDC sandwiched in between. Metal trays are made from aluminum. The primary advantages of plastic over metal is the use of plastic in microwave ovens, as well as consumer preference for plastic packaging and reduced weight.

Cups, cans and buckets are typically cylindrical in shape, or have an axisymmetrical truncated cone shape. Sizes range from about 6 to 16 oz. Shelf stable plastic cans are mainly used for dietary supplements, while plastic cups and buckets are used for soups, stews and baby foods. Metal cans are widely used for soups, vegetables and pet foods. As with plastic trays, the plastic buckets can be used with microwave ovens, while the plastic cups and cans provide better consumer acceptance than metal in certain applications.

Both of the major categories of plastic containers are made by thermoforming a multilayer sheet. In this process the multilayer sheet is coextruded or laminated, then cooled, and stored on a roll. In a secondary operation, the sheet is heated and the trays, cups, cans or buckets are thermoformed by any one of a number of techniques known in the art. One manufacturer, American National Can (ANC), has described a proprietary method, different from thermoforming. The ANC method uses multilayer injection molding where cups, cans or buckets are formed by injecting several types of plastic, including the barrier plastic, into a closed mold, and creating the multilayer structure in this step. *Blow Molding Handbook,* Rosato and Rosato, Hancer 1989, pages 49–50.

There is a desire to develop extended shelf life food containers that are less expensive to produce than conventional extended shelf life containers. In addition, to allow the consumer a choice in food preparation methods, there is a demand for extended shelf life food containers that are also dual ovenable, i.e., are able to be heated in conventional ovens as well as microwave ovens.

A number of microwavable and dual ovenable trays are known. See for example U.S. Pat. Nos. 4,996,086 and 4,896,772. However, these containers are expensive to produce and none provide a suitable shelf life.

It would be desirable to have a food storage container that was retortable, microwavable, provided at least a one year shelf life and can be produced at a lower unit cost than conventional extended shelf life containers.

It would be desirable to have such a food storage container that provided at least a three year shelf life.

It would further be desirable to have such a food storage container that was also capable of being used in a conventional oven.

SUMMARY OF INVENTION

The present invention relates to a retortable multilayer food storage container suitable for microwave use that provides significant shelf-life improvement over prior containers. In a preferred embodiment, the multilayer food storage container of the present invention is dual ovenable.

The present inventors have discovered that the thickness of the barrier layer of the multilayer container of the present invention comprising a liquid crystal polymer (LCP) film needed in order to obtain a three-year shelf life is about 2 to about 5 times thinner than a conventional ethylene-vinyl alcohol barrier layer and over 10 times thinner than a conventional polyvinylidene chloride barrier layer. This substantial down-gauging enhances processability and reduces unit container cost. In addition, the container structure of the present invention is far simpler than traditional multilayer barrier constructions, further improving container economics.

The retortable multilayer container of the present invention comprises a receptacle and lid having at least a barrier layer comprising an LCP film and inner food contact layer comprising at least one thermoplastic material. The receptacle has a base portion and a sidewall portion extending from the base portion defining a storage compartment. The storage compartment has a filling volume from about 0.03 to about 20 liters. The receptacle may be in the form of a tray, cup, bowl, tub or bucket. The tray may be designed as a simple tray or a multi-compartment tray. The receptacle may further have a lip portion extending from the sidewall portion providing an area for the lid to rest.

The receptacle may be used with a lid having a corresponding structure or, though not preferred, with a conventional extended shelf life lid. Likewise, the lid may be manufactured separately and used with conventional containers.

The retortable multilayer container of the present invention can withstand autoclaving in steam at 275° F. for at least 30 minutes. After sterilization of the filled product, it can be stored in the container for at least one year, preferably, at least two years, most preferably, at least three years, without any undesirable changes due to oxygen diffusion into the container or $H_2O$ diffusion out of or into the container during shelf life.

In another embodiment, the receptacle and lid have an outer layer comprising at least one thermoplastic material, this layer being positioned such that the barrier layer is between the food contact layer and the outer layer.

The outer layer and the inner food contact layers each preferably have a thickness about 2 mils to about 50 mils. Most preferably, about 7 mils to about 25 mils.

The LCP film has an oxygen permeability in the range of about 0.008 to about 0.100 cc-mil/100 in.$^2$ 24 hr-atm at 23° C. Most preferably, about 0.008 to about 0.040 cc-mil/100 in.$^2$ 24 hr-atm at 23° C. The LCP film also has a water vapor permeability in the range of about 0.008 to about 0.10 gm-mil/100 in$^2$ 24 hr-atm. Most preferably, the LCP film has a water vapor permeability in the range of about 0.008 to about 0.05 gm-mil/100 in$^2$ 24 hr-atm. The thickness of the barrier layer depends upon the oxygen and water vapor permeability of the LCP film and may range from about 0.25 mils to about 20 mils. Preferably, about 1 mil to about 10 mils. The LCP film is preferably multiaxially oriented.

Thermoplastic materials suitable for use in the present invention are include polypropylene, polyethylene, poly (ethylene terephthalate) (PET) (homopolymers and copolymers), poly(butylene terephthlate) (PBT), PETG (PET modified with cyclohexanedimethanol (CHDM)), PCTA copolymers (a polymer of CHDM and terephthalic acid with another acid substituted for a portion of the terephthalic acid), APET (amorphous polyethylene) terephthelate, CPET (cystallizable PET), PCPT (copolyester containing propylene glycol), PEN (polyethylene naphthalate), and PBN (polybutylene naphthalate). Preferred thermoplastic materials include PET homopolymers and copolymers containing terephthalic acid and isoterephthalic acid, and PCTA. Especially preferred thermoplastic materials include Eastman Kodak Company's KODAR® or EASTAR® A150 (a PCTA copolymer prepared by the reaction of terephthatic acid isophthalic acid and cyclohexane dimethanol), KODAR® or EASTAR™ 9921, KODA-PAK® or EASTAPAK™ 7352 (a PET homopolymer produced from dimethyl terephthalate and ethylene glycol), KODAR® or EASTAR™ 9921W (a PET resin)and EASTMAN™ 1339; Shell's TRAYTUFF™ 8006 (a PET copolymer comprising terephthalic acid, isoterephthalic acid and ethylene glycol); DuPont's CRYSTAR™ 1927 (a standard PET resin) and SELAR™ PT7067; and Shell's TRAYTUFF™ CPET(a combination of crystalline poly(ethylene terephthalate) and amorphous poly(ethylene terephthalate) 1927 and Selar™ PT7067; and Shell's Traytuff™ CPET. A combination of crystalline poly(ethylene terephthalate) and amorphous poly(ethylene terephthalate) may also be used. Blends and alloys of thermoplastic materials may be used.

In producing the dual ovenable embodiment of the present invention it is necessary to select a thermoplastic material that can withstand conventional oven temperatures. Crystallized PET (CPET) is a preferred thermoplastic material for such applications.

Preferred thermotropic LCPs used to produce the LCP film include wholly or partially aromatic polyesters or copolyesters. Particularly preferred copolyesters include VECTRA® (poly(oxybenzoyl-co-oxynaphthoyl), Hoechst-Celanese), XYDAR™ (poly(oxybenzyl-cobisphenyl terephthalate), Amoco Performance Products) and ZENITE™ (a wholly aromatic liquid crystal polymer (LCP) resin, E. I. duPont de Nemours).

Other preferred thermotropic liquid crystal polymers include SUMIKASUPER® (a thermotropic LCP, Sumitomo Chemical), EKONOL™ (a type I LCP, Carboruundum), DuPont HX™ (poly(p-phenylene-terphthalate based on phenylhydrodquinone), RODRUN® (a type II LCP, Unitika) and GRANLAR™ (a Type I LCP, Granmont).

DETAILED DESCRIPTION OF THE INVENTION

Figure 1:
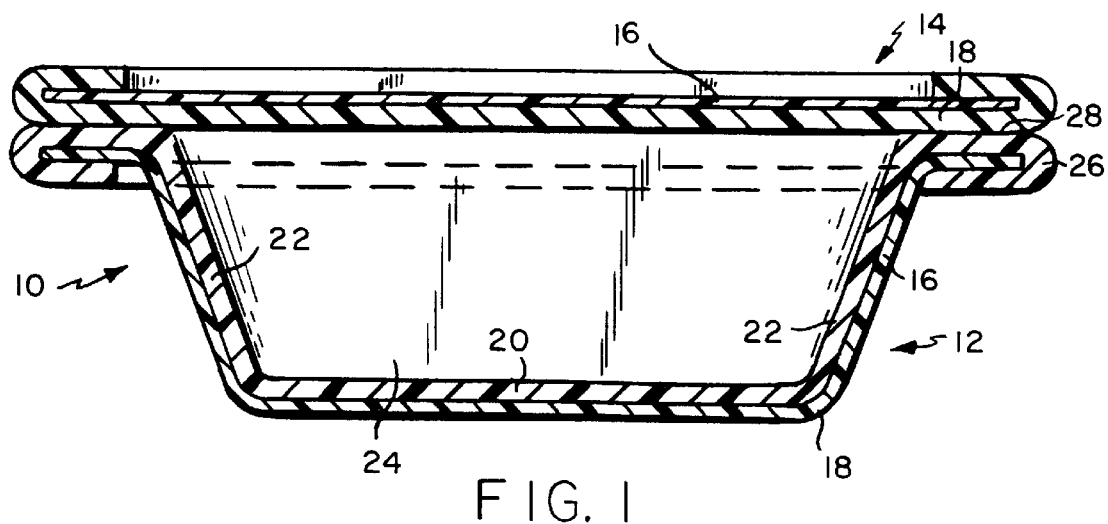
FIG. 1 is a sectional view of one embodiment of the multilayer container of the present invention.

The retortable multilayer container according to the invention is explained with reference to the drawings. As shown in FIG. 1, the multilayer container 10 of the present invention comprises a receptacle 12 and lid 14 each having a barrier layer 16 comprising a thermotropic liquid crystal polymer (LCP) film and inner food contact layer 18 comprising at least one thermoplastic material. The receptacle 12 has a base portion 20 and a sidewall portion 22 extending from the base portion defining a storage compartment 24. A lip portion 26 extends from the sidewall portion 22 providing an area 28 for the lid 14 to rest and be attached to the receptacle 12.

Figure 2:
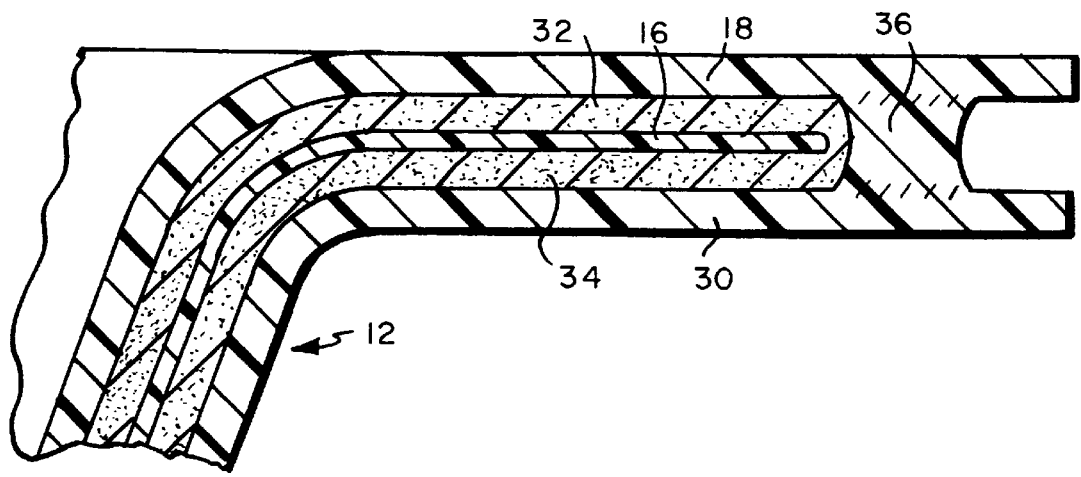
FIG. 2 shows a sectional view of a portion of a multilayer receptacle that is the subject of the present invention.

In another embodiment of the multilayer container of the present invention to further prevent permeation of oxygen into the storage compartment, as shown in FIG. 2, the receptacle 12 has an outer layer 30 comprising at least one thermoplastic material. The outer layer 30 is positioned such that the barrier layer 16 is between the food contact layer 18 and the outer layer 30. An adhesive layer 32 laminates the barrier layer 16 and the outer layer 30 and second adhesive layer 34 laminates the barrier layer 16 and the food contact layer 18. The adhesive layers 32 and 34, in addition to boding the layers, act as a sealant preventing oxygen from circumventing the barrier layer 16.

To further prevent oxygen circumventing the barrier layer 16, as shown in FIG. 2 the barrier layer 16 can be formed having a smaller outside flange dimension than the food contact layer 18 and the outer layer 30 allowing the barrier layer 16 to be encapsulated between the these layers using, for example, a spot weld 36. The corresponding lid is formed having a similar structure.

The lid can be attached to the receptacle using a number of techniques known in the art, including use of heat sealing by either conduction, induction (RF) sealing, impluse resistance wire, ultrasonic, vibrational, IR or other known heat sealing apparatus. Alternatively, adhesives or spot welding can be used.

Thermoplastic materials suitable for use in the present invention must be capable of withstanding retort conditions, i.e, autoclaving in steam at 275° F. for 30 minutes. Such materials are prepared by methods well known in the art. A variety of methods for making suitable PET homopolymers and copolymers are well known in the art. For example, one suitable PET for use in the present invention is prepared by the reaction of either terephthalic acid or dimethyl terephthalate with ethylene glycol. Various copolymers of PET have been developed and are also prepared by methods well known to the skilled artisan. Suitable thermoplastic aromatic polyester is also available commercially from a number of vendors. Especially preferred commercially available thermoplastic aromatic polyesters include Eastman Kodak Company's KODAR® or EASTAR® A150 (a PCTA copolymers prepared by the reaction of terephthatic acid isophthalic acid and cyclohexane dimethanol), KODAR® or EASTAR™ 9921 (a PET resin), KODAPAK® or EASTAPAK™ 7352 (a PET homopolymer produced from dimethyl terephthalate and ethylene glycol), KODAR® or EASTAR™ 9921W and EASTMAN™ 1339; Shell's TRAYTUFF™ 8006 (a PET copolymer comprising terephthalic acid, isoterephthalic acid and ethylene glycol); DuPont's CRYSTAR™ 1927 (a standard PET resin) and SELAR™ PT7067; and Shell's TRAYTUFF™ CPET(a combination of crystalline poly(ethylene terephtalate) and amorphous poly(ethylene terephthalate).

Suitable PCTA copolymers e.g., Kodar® or Eastar™ A150, for use in the present invention are prepared by the reaction of terephthatic acid isophthalic acid, and cyclohexane dimethanol. Kodar® or Eastar™ A150 is one preferred commercially available PCTA for use in the present invention. Preferred commercially available PETs include a PET homopolymer produced from dimethyl terephthalate and ethylene glycol such as Kodapak® or Eastapak™ 7352; a PET copolymer comprising terephthalic acid, isoterephthalic acid and ethylene glycol such as Shell's Traytuff™ 8006; and a CPET such as Shell's Traytuff™ CPET. A combination of crystalline poly(ethylene terephthalate) and amorphous poly(ethylene terephthalate) may also be used.

In producing the dual ovenable embodiment of the present invention it is necessary to select a thermoplastic material that can withstand conventional oven temperatures. Crystallized PET (CPET) is a preferred thermoplastic material for such applications.

The outer layer and the inner food contact layers preferably have a thickness about 2 mils to about 50 mils. Most preferably, about 7 mils to about 25 mils.

Suitable thermotropic LCPs for use in the present invention include wholly and partially aromatic polyesters and co-polyesters such as those disclosed in U.S. Pat. Nos. 3,991,014, 4,067,852, 4,083,829, 4,130,545, 4,161,470, 4,318,842, and 4,468,364.

Preferred thermotropic LCPs include wholly or partially aromatic polyesters or copolyesters. Particularly preferred copolyesters include VECTRA® (poly(oxybenzoyl-co-oxynaphthoyl), Hoechst-Celanese), XYDAR™ (poly (oxybenzyl-cobisphenyl terephthalate), Amoco Performance Products) and ZENITE™ (a wholly aromatic liquid crystal polymer (LCP) resin, E. I. duPont de Nemours) crystal polymers include SUMIKASUPER® (a thermotropic LCP, Sumitomo Chemical), EKONOL™ (a type I LCP, Carboruundum), DuPont HX™ (poly(p-phenylene-terphthalate based on phenylhydrodquinone), RODRUN® (a type II LCP, Unitika) and GRANLAR™ (a Type I LCP, Granmont).

Vectra® A950, sold by Hoechst-Celanese Corporation, Summit, N.J. is one preferred wholly aromatic copolyester. This polymer has been reported to consist essentially of about 25–27 percent of 6-oxy-2-naphthoyl moieties and about 73–75 percent of p-oxybenzoyl moieties, as described in example 4 of U.S. Pat. No. 4,468,364 and in G. W. Calundann et al., "Anisotropic Polymers, Their Synthesis and Properties", reprinted from Proceedings of the Robert A. Welch Conferences on Chemical Research, XXVI Synthetic Polymers, Nov. 15–17, 1982, Houston, Tex., pp. 247–291 (see especially pp. 263–265).

Another particularly preferred thermotropic LCP is ZENITE™. This polymer has been reported to consist of hydroxy-benzoic acid/phenyl hydroquinone/dimethyl-napthylene dicarboxylate units.

In the production of LCP films from the polymers described above, the polymer is melt extruded, e.g., through a slot die, a circular, counter-rotating die, or a circular rotating trimodal die.

Multiaxially oriented LCP films are preferably used. Such films can be made from thermotropic LCPs by methods described in U.S. Pat. Nos. 4,966,807 and 5,288,529.

The gross oxygen package transmission rate (GTR) required to achieve a three year shelf life depends on a number of factors, including the barrier performance of the container, oxygen remaining in the head space, food type, tray geometry and lidstock performance. Based on theory a three year shelf life can normally be achieved by having a package oxygen transmission rate of 0.3 cc/year. Thus, for example, with a starch/vegetable or dessert size tray that has an approximate inner dimensions of 4.75×3×1.25 in. deep with a practical capacity of 7.5 fl. oz., assuming an LCP permeability of 0.005 to 0.01 cc-mil/100 in$^2$ day-atm., to attain a three year shelf life the thickness of the LCP film would be about 3.5 to 7 mils.

The thickness of the barrier layer depends upon the oxygen and water vapor permeability of the LCP film. The LCP film has an oxygen permeability in the range of about 0.008 to about 0.100 cc-mil/100 in.$^2$ 24 hr-atm. at 23° C. Most preferably, about 0.008 to about 0.040 cc-mil/100 in.$^2$ 24 hr-atm. at 23° C. The LCP film also has a water vapor permeability in the range of about 0.008 to about 0.10 gm-mil/100 in$^2$-24 hr-atm. Most preferably, the LCP. film has a water vapor permeability in the range of about 0.008 to about 0.05 gm-mil/100 in$^2$-24 hr-atm. The thickness of the barrier layer may range from about 0.10 mils to about 20 mils. Preferably, about 0.5 mils to about 10 mils. Most preferably, about 1 mil to about 5 mils.

In the multi-layer container as described herein, a tie or an adhesive layer may also be present between the layers. Laminates using this invention may include any suitable tie layer or adhesives known in the art and may include polyurethane curing adhesives, anhydride modified polyoefins, such as graft copolymers of maleic anhydride and ethylene, ethylene acrylic acid copolymers, ethylene methyl acrylate copolymers, PP and EVA blends or copolymers or other synthetic adhesive resins. The selected adhesive should be stable under retort conditions. A food grade adhesive that conforms to FDA regulations 21 CFR175.105 and 21CFR177.1390 is preferred. Such a preferred adhesive is the polyester based adhesive Morton 76T198.

The multilayer container of the present invention may be formed by any of the conventional processes for making multilayer films, including laminations, extrusions, coextrusions, blown extrusion, extrusion coatings, and the like, and combinations thereof.

For example, the receptacle of the multilayer container of the present invention may be produced by forming each layer of the receptacle, for example when the receptacle is a tray, as a separate molded tray. Each layer is then bonded together to form the multilayer container using, for example, an adhesive or thermally bonded.

The three layer embodiment of the multilayer container may be produced by forming each layer of the receptacle, for example when the receptacle is a tray, as three separate molded trays. As shown in FIG. 2, the tray forming the barrier layer can have a smaller outside flange dimensions allowing the barrier layer to be encapsulated between the outer layer and the inner food contact layer thus preventing oxygen from circumventing the barrier layer.

The multilayer container of the present invention can also be produced by separately extruding each layer and laminating each layer together using, for example, adhesives or tie layers. The laminated layers are then thermoformed into the final receptacle and lid.

The multilayer container of the present invention can further be produced by coextruding a laminate consisting of the thermoplastic and barrier layers with an adhesive layer between the thermoplastic and barrier layers. The laminate is then cooled, cut to the desired size and thermoformed into the final tray. Alternatively, the coextruded laminate is extruded onto a mold and thermoformed while still in a plasticated state.

When the multilayer container is subjected to autoclaving in steam at 275° F. for 30 minutes, the container substantially retains all original dimensions without significant undesirable buckling, wrinkling or distortion. Thus, it may be used for sterilization processing of foods or liquids. The container may be used in a microwave oven. In embodiments in which thermoplastic materials which can withstand convection oven temperatures of up to about 400° F. to about 450° F., the container can also be used in a conventional oven.

The following non-limiting example is given by way of illustration and is not intended to be considered a limitation of this invention.

EXAMPLE 1

Multilayer Container Fabrication Procedures

A multilayer container of the present invention was fabricated using three separate trays bonded together in a manner that significantly reduces oxygen permeation through the container. The three layers, designated as food contact, barrier and outer were thermoformed using a series of custom molds.

The food contact and outer layers were fabricated using a coextruded sheet stock consisting of crystalline poly(ethylene terepthalate) (CPET) and amorphous poly(ethylene terepthalate) (APET). The food contact and outer trays were respectively 25 and 43 mils thick and were produced using Eastman sheet stock (12822 and 9921). The outer tray had the APET surface on the inside. The food contact tray had the APET surface on the outer side. The barrier layer was made of liquid crystalline polymer (LCP) (Hoechst-Celanese Vectra A-950) and was 12 mils (±1 mil) thick.

Figure 3:
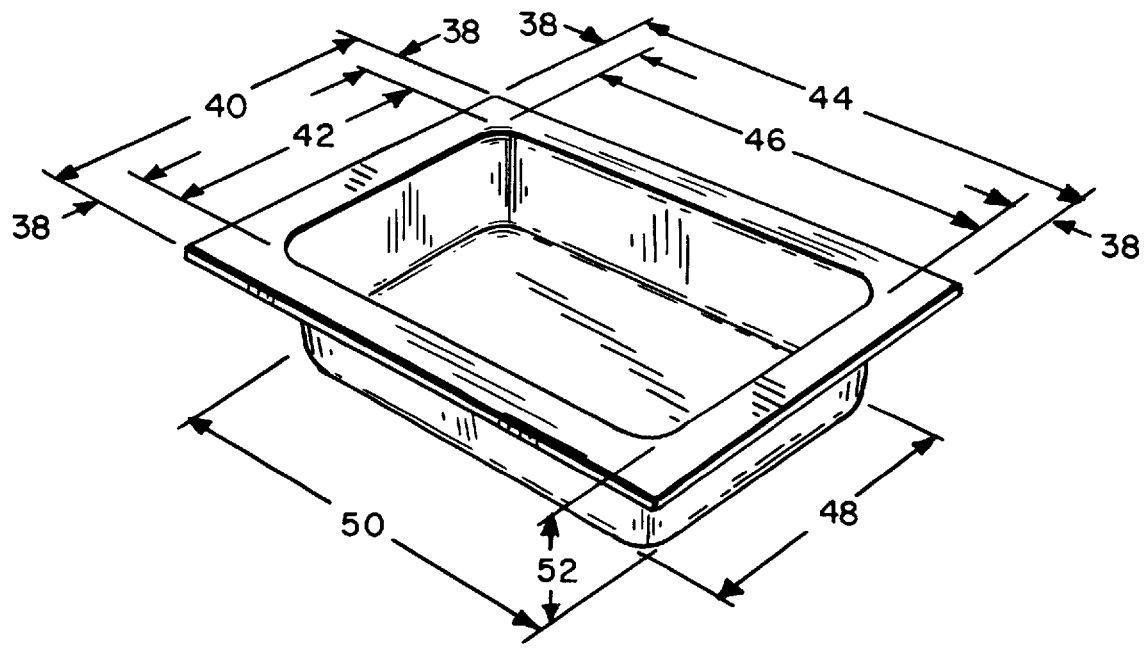
FIG. 3 shows tray dimensions of one embodiment of the present invention.

The tray dimensions are illustrated in FIG. 3 and set forth below in Table 1.

TABLE 1

| | (dimensions in inches) | | | | | | | |
|---|---|---|---|---|---|---|---|---|
| | 38 | 40 | 42 | 44 | 46 | 48 | 50 | 52 |
| Food Container Layer | 0.50 | 4.50 | 3.50 | 6.00 | 5.00 | 2.89 | 4.45 | 1.07 |
| Barrier Layer | 0.25 | 4.00 | 3.50 | 5.45 | 4.95 | 3.00 | 4.65 | 1.14 |
| Outer Layer | 0.50 | 4.50 | 3.50 | 6.00 | 5.00 | 3.11 | 4.85 | 1.21 |

A 0.5 inch wide lip was used to seal the individual trays into a unified container.

Figure 4:
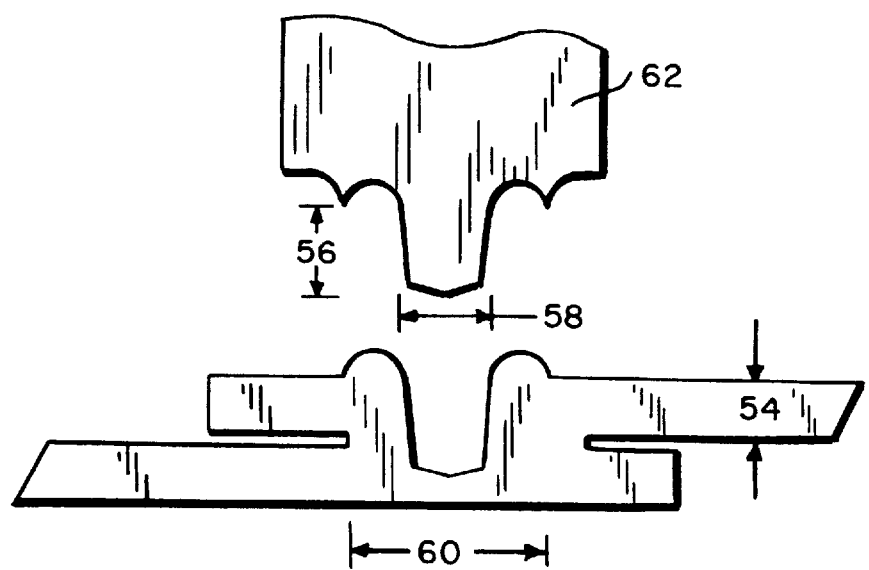
FIG. 4 shows an ultrasonic spot welding horn used in the Example with dimensions related to sheet thickness.

A food grade adhesive and ultrasonic welding techniques were used to produce the three layer multilayer container. The food grade adhesive (Morton 76T198) is a polyester based adhesive that conforms to FDA regulation 21 CFR175.105 and 21CFR177.1390. The ultrasonic spot welding system used a hand held ultrasonic gun and a spot welding horn 62, as shown in FIG. 4. The dimensions of the horn were selected based on the thickness (T) of the plastic sheet, as shown in FIG. 4 the distance between points 54. The thickness of 56 and 58 are 1.5 times T. The thickness of 60 is three times T.

The procedure for assembling the three layer container was as follows:

1. The lip of the LCP tray was cut back 0.25 inches leaving a 0.25 inch lip.
2. A 1 inch wide band of adhesive was applied to the top of the LCP tray covering the lip and extending down onto the tray side wall.
3. A inch wide band of adhesive was applied to the top of the outer tray covering the lip and extending down onto the tray side wall.
4. The adhesive was allowed to cure for 24 hours in accordance with the manufacturers specifications.
5. The three trays are then assembled and held together using pressure.
6. The outer and food contact tray lips where the APET surfaces come in contact were sealed together using the ultrasonic spot welding apparatus described above. Welds were approximately 0.0625 inches from the middle LCP tray and about 0.15 inches apart.
7. The adhesive is then allowed to cure for 7 to 14 days.

In the final configuration the spot welds provide the bond strength between the inner and outer trays. The adhesive primarily serves as a sealant to the permeation of oxygen around the LCP barrier layer and into the container.

The foregoing description of the invention is merely illustrative thereof, and it is understood that variations and modifications can be effected without departing from the spirit or scope of the invention as set forth in the following claims.

We claim:

1. A retortable multilayer container comprising:
   (a) a receptacle having a barrier layer comprising a thermotropic liquid crystal polymer (LCP) film and inner food contact layer comprising at least one thermoplastic material, said receptacle having a base portion and a sidewall portion extending from said base portion defining a storage compartment; and
   (b) a lid having a barrier layer comprising a thermotropic liquid crystal polymer (LCP) film and an inner food contact layer comprising at least one thermoplastic material.

2. The multilayer container of claim 1, wherein said receptacle further comprises a lip portion extending from said sidewall portion, wherein said lid rests at least on said lip portion of said receptacle.

3. The multilayer container of claim 1, wherein said receptacle and lid further comprise an outer layer comprising at least one thermoplastic material, said outer layer positioned such that said barrier layer is between said food contact layer and said outer layer.

4. The multilayer container of claim 1, wherein the thermoplastic material is selected from the group consisting of polypropylene and poly(ethylene terephthalate).

5. The multilayer container of claim 4, wherein the thermoplastic material is poly(ethylene terephthalate).

6. The multilayer container of claim 5, wherein the poly(ethylene terephthalate) is crystalline poly(ethylene terephthalate).

7. The multilayer container of claim 5, wherein the poly(ethylene terephthalate) is a combination of crystalline poly(ethylene terephthalate) and amorphous poly(ethylene terephthalate).

8. The multilayer container of claim 1, wherein said liquid crystal polymer film comprises one or more wholly or partially aromatic polyesters or copolyester.

9. The multilayer container of claim 8, wherein the wholly aromatic polyester or copolyester comprises 6-oxy-2-naphthoyl and p-oxybenzoyl moieties.

10. The multilayer container of claim 9, wherein the wholly aromatic polyester or copolyester comprises about 25–27 percent of 6-oxy-2-naphthoyl moieties and about 73–75 percent of p-oxvbenzoyl moieties.

11. The multilayer container of claim 8, wherein the wholly aromatic polyester or copolyester comprises hydroxy benzoic acid/phenyl hydroquinone/dimethyl-napthylene dicarboxylate units.

12. The multilayer container of claim 8, wherein the wholly aromatic polyester or copolyester comprises (poly (oxybenzoylco-oxynaphthoyl) or (poly(oxybenzyl-co-bisphenyl terephthalate).

13. The multilayer container of claim 1, wherein the thermotropic liquid crystal polymer film has an oxygen permeability in the range of 0.008 to 0.100 cc-mil/100 in.$^2$ 24 hr-atm.

14. The multilayer container of claim 1, wherein the thermotropic liquid crystal polymer film has a water vapor permeability in the range of about 0.008 to about 0.10 gm-mil/100 in$^2$-24 hr-atm.

15. The multilayer container of claim 1, wherein the LCP film is multiaxially-oriented.

16. The multilayer container of claim 1 or 3, wherein the outer structural layer and the inner food contact layer has a thickness between 5 mils and 50 mils.

17. The multilayer container of claim 1, wherein the barrier layer has a thickness between 0.25 mils and 20 mils.

18. The multilayer container of claim 1, wherein the receptacle storage compartment has a filling volume of about 0.2 to 20 liters.

19. The multilayer container of claim 2, wherein said lid is heat sealed to said receptacle.

20. The multilayer container of claim 1, further comprising an adhesive layer laminating the barrier layer and the food contact layer.

21. The multilayer container of claim 3, further comprising an adhesive layer laminating the barrier layer and the outer layer and an adhesive layer laminating the barrier layer and the food contact layer.

22. A retortable multilayer dual ovenable container comprising:

(a) a receptacle having an outer layer comprising CPET, an inner food contact layer comprising CPET, a barrier layer comprising a liquid crystal polymer (LCP) film formed from poly(oxvbenzoyl-co-oxynaphthoyl), said receptacle having a base portion and a sidewall portion extending from said base portion defining a storage compartment; and (b) a lid having an outer layer comprising CPET, an inner food contact layer comprising CPET and a barrier layer comprising a liquid crystal polymer (LCP) film formed from poly(oxvbenzoyl-co-oxynaphthoyl).

* * * * *